United States Patent [19]

Cook et al.

[11] 4,293,801

[45] Oct. 6, 1981

[54] CATHODE RAY TUBE ASSEMBLIES

[75] Inventors: Frank Cook, Rochdale; Gordon H. Davies, Wilmslow, both of England

[73] Assignee: Thorn EMI Limited, Rochdale, England

[21] Appl. No.: 127,527

[22] Filed: Mar. 5, 1980

[30] Foreign Application Priority Data

Mar. 6, 1979 [GB] United Kingdom .............. 07913/79

[51] Int. Cl.³ ............................................ H01J 29/56
[52] U.S. Cl. ...................................... 315/370; 358/190
[58] Field of Search ............. 315/370, 371, 368, 13 C; 358/190; 328/262, 264, 268

[56] References Cited

U.S. PATENT DOCUMENTS 3,730,991 5/1973 Sanford ............................... 358/190
4,028,586 6/1977 Mengle ............................... 315/13 C

*Primary Examiner*—Theodore M. Blum
*Attorney, Agent, or Firm*—Kerkam, Stowell, Kondracki & Clarke

[57] ABSTRACT

A cathode ray tube assembly has a circuit arrangement to connect the heater R1 of a cathode ray tube to an associated D.C. supply, (via terminals 12 and 13), and the circuit arrangement also includes at least one component, such as two components comprising astigmatism correction coils 10, to be energized by the D.C. supply, and a matrix of assymetrical conducting devices, for example, a diode bridge D1, D2, D3 and D4, arranged to ensure that the current flow through each of said at least one component individually is in one predetermined direction, irrespective of the direction of the flow of current from the D.C. supply.

6 Claims, 1 Drawing Figure

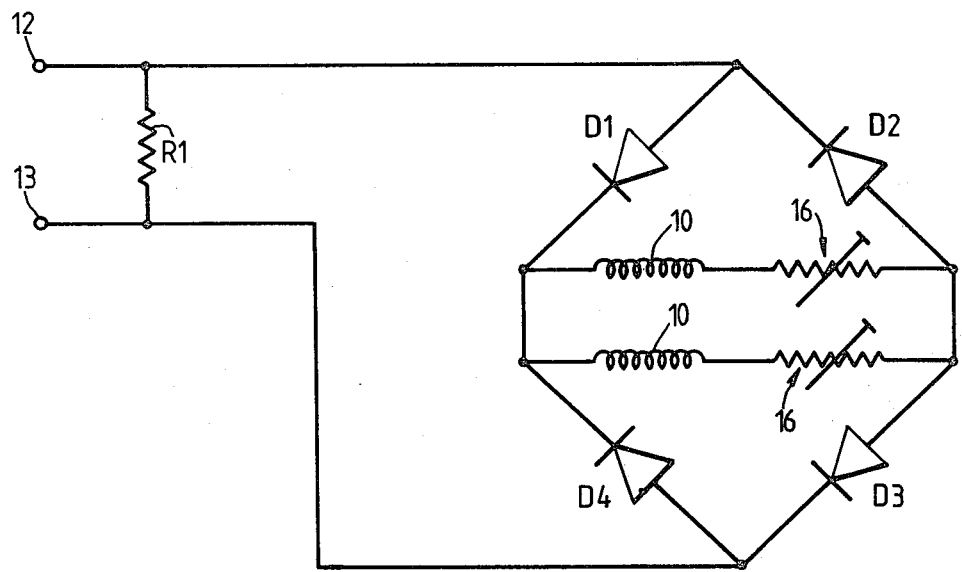

CATHODE RAY TUBE ASSEMBLIES

This invention relates to cathode ray tube assemblies.

In some cathode ray tube assemblies it is required to provide components which, previously, have been driven by power supplies provided solely to energise such components. However, the provision of such separate power supplies is inconvenient.

It is an object of the present invention to provide a cathode ray tube assembly whereby at least some such components, conveniently, can be energised without the necessity of having to provide separate power supplies solely for these components.

According to the present invention a cathode ray tube assembly has a circuit arrangement to connect the heater of the cathode ray tube to an associated D.C. supply, to energise the heater in a, known, required manner, there also being included in the circuit arrangement at least one component of the cathode ray tube assembly to be energised by the associated D.C. supply, together with a matrix of assymmetrical conducting devices arranged such that the current flow through each of said at least one component individually is in one predetermined direction, irrespective of the direction of the flow of current from the associated D.C. supply to the circuit arrangement.

In one such circuit arrangement the matrix comprises a bridge, said at least one component being connected in parallel with each of two appropriate pairs of arms of the bridge, and the current flow to energise said at least one component being supplied between the mid-points of each of said two appropriate pairs of arms of the bridge.

It is essential that the associated D.C. supply provides sufficient current to energise both the heater and said at least one component, in the same circuit arrangement, in a satisfactory manner. Desirably, the circuit arrangement is such that, under normally-encountered operating conditions for the cathode ray tube assembly the current flow through the heater does not vary by more than ±10%.

Whilst it is inconvenient to provide separate power supplies solely to energise components of cathode ray tube assemblies, previously it has not been considered for, at least some, such components to share the same power supplies with the heaters, because of the required increase in the currents to be supplied by the heater supplies, over the currents, to be supplied solely to the heaters. However, in relation to at least some such components of cathode ray tube assemblies, such increases in the currents conveniently can be supplied by the heater supplies, avoiding the necessity of providing separate power supplies solely for such components.

Two such components, in the same circuit arrangement as the heater of a cathode ray tube, may comprise beam alignment coils or astigmatism correction coils.

It is conventional to disregard the direction of current flow through the heater of a cathode ray tube. Consequently, it is usual to consider that the current flow through the heater is in either of the two possible directions. Hence, the heater supply has not been considered previously to be employed also to energise components of the cathode ray tube assembly, each of which components requires current to be supplied individually in only one predetermined direction, for example, two such components comprising beam alignment coils, or astigmatism correction coils.

If more than one component is provided in the circuit arrangement, the components may be connected in parallel with each other. The matrix may be connected in parallel with the heater.

The present invention will now be described by way of example with reference to the accompanying drawing, comprising a diagram of a circuit arrangement, included in a cathode ray tube assembly comprising one embodiment in accordance with the present invention, the circuit arrangement to connect the heater of the cathode ray tube to an associated D.C. supply, the associated D.C. supply also to energise two components comprising two coils for correcting astigmatism, the two coils also being included in the circuit arrangement.

Within a cathode ray tube assembly, generally of a conventional form, and having two coils 10 to correct for astigmatism, a circuit arrangement is provided to connect the heater of the cathode ray tube to an associated D.C. supply. In the FIGURE, which shows the circuit arrangement, the heater is represented by a resistor R1, and the associated D.C. supply (not shown), to energise the heater, is to be connected to terminals 12 and 13 of the circuit arrangement. The associated D.C. supply energizes the heater R1 in a known, required manner.

The coils 10 to correct for astigmatism each is required to be energised by a small current, for example, 20 milliamperes, and it is inconvenient to provide a separate power supply for this purpose. Previously, it has not been considered for the astigmatism correction coils 10 to share the same power supply as the heater R1, because of the required increase in the current to be supplied by the heater supply, over the current to be supplied solely to the heater. However, such an increase in the current conveniently can be supplied, for example, when the heater requires a current of 300 milliamperes, and hence the necessity of providing a separate power supply for the astigmatism correction coils can be obviated.

However, it is conventional to disregard the direction of current flow through the heater R1 of the cathode ray tube, and consequently it is usual to consider that the current flow through the heater is in either of the two possible directions. Thus, previously, the heater supply has not been considered to be employed also to energise astigmatism correction coils 10, each of which coils individually requires current to be supplied in only one predetermined direction.

As shown in the illustrated circuit arrangement to connect the heater R1 to its associated D.C. supply, a bridge of assymmetrical conducting devices, the illustrated bridge comprising diodes D1, D2, D3, and D4, also is included in the circuit arrangement. Each coil 10 is connected in parallel with each of two appropriate pairs of arms of the bridge, and the two coils 10 are connected in parallel with each other. The bridge is connected in parallel with the heater R1, with the D.C. supply connected to the mid-points of each of said two appropriate pairs of arms of the bridge. A potentiometer 16 is connected in series with each coil 10, a potentiometer being connected individually to each coil, so that the current through each coil individually can be varied.

Hence, the illustrated circuit arrangement is such that the current flow through either coil 10 individually is in one predetermined direction, irrespective of the direction of the current flow from the associated D.C. supply.

Usually, the circuit arrangement is such that, under normally-encountered operating conditions for the cathode ray tube assembly the current flow through the heater does not vary by more than ±10%. It is essential that the associated D.C. supply provides sufficient current to energise both the heater and the coils in a satisfactory manner. Conveniently, the associated D.C. supply is arranged to be capable of providing a maximum current of 600 milliamperes, and the cathode ray tube heater may require only a current of 300 milliamperes.

The circuit arrangement may be modified in various other ways, but the bridge is required to be arranged so that the current flows through each of the coils 10 individually in one predetermined direction, irrespective of the direction of the flow of current from the associated D.C. supply.

When more than one component is included in the circuit arrangement to connect the cathode ray tube heater to the associated D.C. supply, such constituent components may not be connected in parallel with each other.

Only one such component may be provided in the circuit arrangement.

The component or components to be energised by the same supply as energises the heater may have any desired form, for example, two such components, comprising beam alignment coils, instead of astigmatism correction coils.

The bridge of assymmetrical conducting devices may comprise zener diodes, or transistors, instead of diodes.

A suitable matrix of such assymetrical conducting devices may be provided instead of a bridge.

The matrix or bridge may not be connected in parallel with the heater.

The potentiometers in series with the components may be omitted.

We claim:

1. A cathode ray tube assembly having a circuit arrangement to connect the heater of the cathode ray tube to an associated D.C. supply, to energise the heater, there also being included in the circuit arrangement at least one component of the cathode ray tube assembly to be energized by the associated D.C. supply, together with a matrix of assymetrical conducting devices arranged such that the current flow through each of said at least one component individually is in one predetermined direction, irrespective of the direction of the flow of current from the associated D.C. supply to the circuit arrangement.

2. A cathode ray tube assembly as claimed in claim 1 in which the matrix comprises a bridge, said at least one component being connected in parallel with each of two appropriate pairs of arms of the bridge, and the current flow to energise said at least one component being supplied between the mid-points of each of said two appropriate pairs of arms of the bridge.

3. A cathode ray tube assembly as claimed in claim 1 in which said at least one component at least includes beam alignment coils.

4. A cathode ray tube assembly as claimed in claim 1 in which said at least one component comprises astigmatism correction coils.

5. A cathode ray tube assembly as claimed in claim 1 in which a plurality of components are connected in parallel with each other in the circuit arrangement.

6. A cathode ray tube assembly as claimed in claim 1 in which the matrix is connected in parallel with the heater.

* * * * *

UNITED STATES PATENT AND TRADEMARK OFFICE
CERTIFICATE OF CORRECTION

PATENT NO. : 4,293,801
DATED : October 6, 1981
INVENTOR(S) : Frank Cook, et al

It is certified that error appears in the above—identified patent and that said Letters Patent are hereby corrected as shown below:

On the Title page Item-

" [73] Assignee: Thorn EMI Limited, Rochdale, England"

should read:

-- "[73] Assignee: Thorn EMI Limited, London, England --.

Signed and Sealed this

Twenty-ninth Day of June 1982

[SEAL]

Attest:

GERALD J. MOSSINGHOFF

Attesting Officer      Commissioner of Patents and Trademarks